Feb. 21, 1939.  J. C. SUTTON  2,147,936
BATHROOM SCALE
Filed June 21, 1937  2 Sheets-Sheet 1
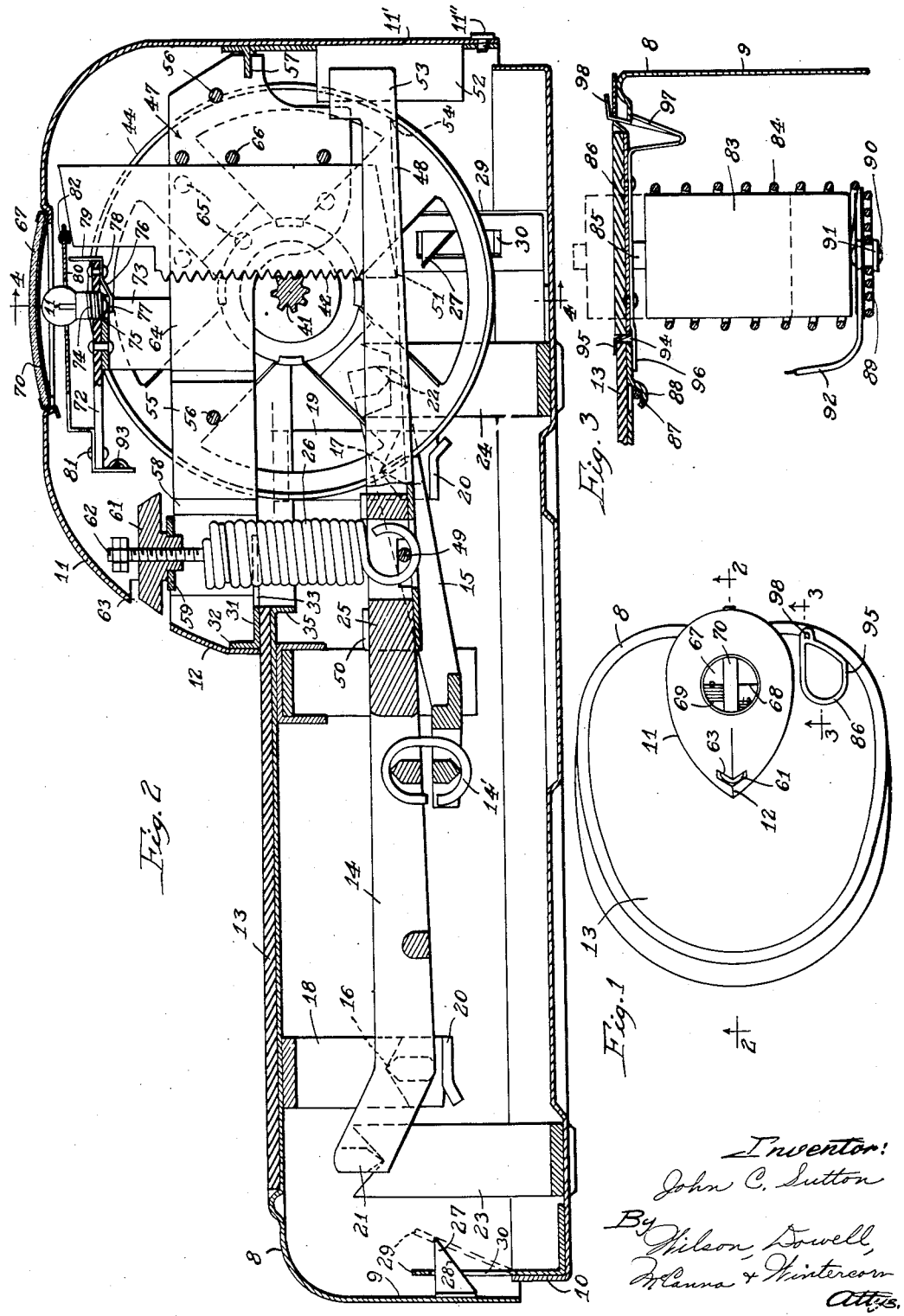

Feb. 21, 1939.   J. C. SUTTON   2,147,936
BATHROOM SCALE
Filed June 21, 1937   2 Sheets-Sheet 2
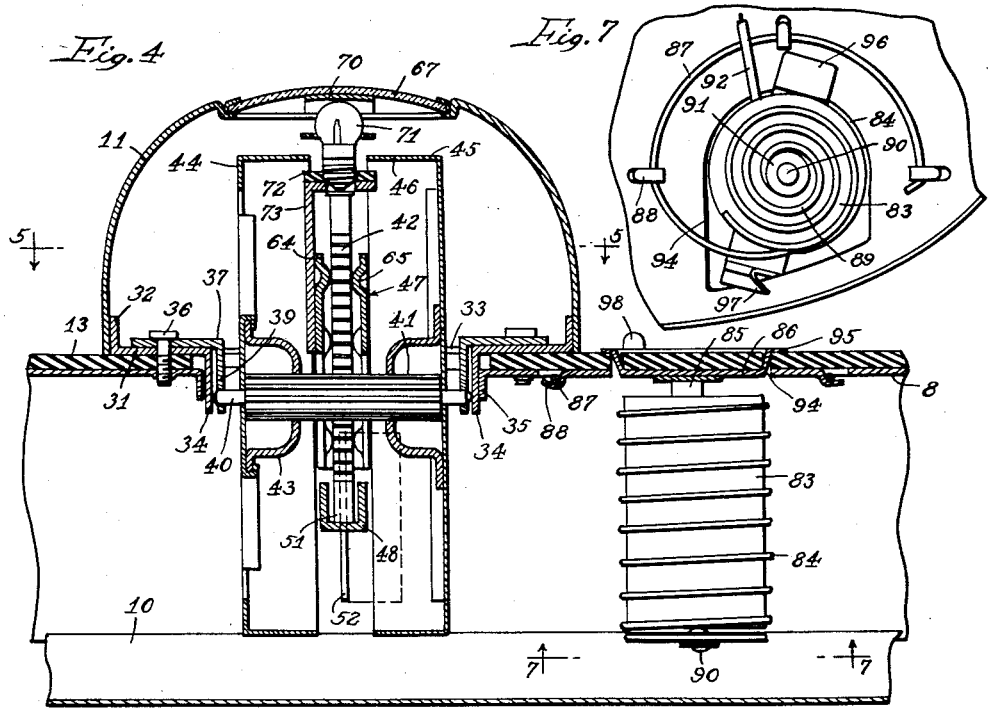
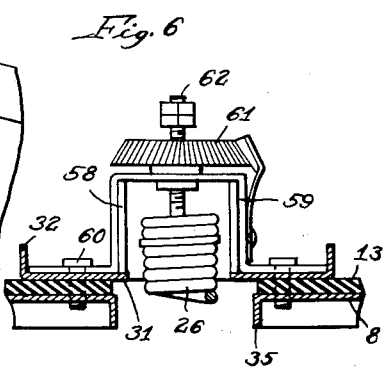
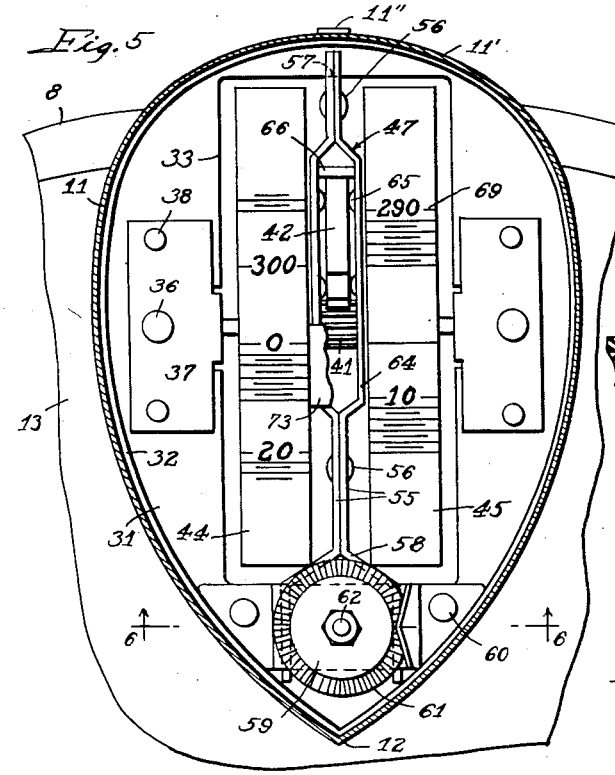
Inventor:
John C. Sutton
By Wilson, Dowell
McCanna & Wintercorn
Attys.

Patented Feb. 21, 1939

2,147,936

UNITED STATES PATENT OFFICE 2,147,936

BATHROOM SCALE

John C. Sutton, Rockford, Ill., assignor to The Brearley Company, Rockford, Ill., a corporation of Illinois Application June 21, 1937, Serial No. 149,394

19 Claims. (Cl. 265—68)

This invention relates to weighing scales, and has particular reference to one especially designed for bathroom use.

Bathroom scales have generally been subject to the objection that they are not easy to read. Usually when special attention was given to easier reading by enlargement of the dial, it resulted in a scale of poor appearance, and, on the other hand, when through a desire to secure better appearance the dial housing was reduced in size, it invariably resulted in greater difficulty in reading. This has naturally led to a demand for a scale with an illuminated dial, and it is the principal object of the present invention to provide a practical and serviceable scale electrically lighted to make dial reading easy, the same being constructed so that stepping on the platform automatically turns on the light to make the numerals and graduations sharply visible under the most adverse conditions.

Another object is to provide a scale of the type mentioned in which the dry cell battery for the light is quickly and easily replaceable when burned out, the same being accessible through the platform in a novel manner and arranged to be expelled automatically under spring action so as to avoid any difficulty in extricating it.

A further object, with a view to easy reading, is the provision of two parallel dials side by side in concentric relation with the readings alternated on the two dials, providing large numerals at ten-pound intervals with only two-pound and one-pound scale graduations between, the spaces left between the graduated portions on each dial making for easy reading by avoiding the blur that is otherwise noticed where there is a solid column of closely spaced graduations. The light is furthermore placed over and between the dials with a shield over it to avoid glare, but at the same time throw plenty of light over the dials for easy reading.

Still another object designed to relieve the indicating mechanism of shocks and jars, in the event of rough usage of the scale, is to provide a rack meshing with the dial-rotating pinion and not actually connected with the lever mechanism but merely resting thereon and arranged to gravitate smoothly in turning the dials, so that there is no jerky motion, and if the scale platform is jarred the shock is not transmitted to the dials.

Another object is to provide a scale in which the platform is made of hollow sheet metal construction and encloses the base and has almost the entire scale mechanism assembled therein, the platform with the parts assembled therein being arranged to be inverted and set down over the base and detachably connected therewith in a novel manner, whereby the assembling of the scale is greatly simplified and the scale may be produced at low cost.

Other objects and advantages of the invention will appear in the course of the following detailed description wherein reference is made to the accompanying drawings, in which—

Figure 1 is a plan view of a bathroom scale made in accordance with my invention;

Fig. 2 is a longitudinal section on the line 2—2 of Fig. 1, on a larger scale;

Fig. 3 is a sectional detail on the line 3—3 of Fig. 1, on the same scale as Fig. 2;

Fig. 4 is a cross-section on the line 4—4 of Fig. 2;

Fig. 5 is a horizontal sectional detail on the line 5—5 of Fig. 4;

Fig. 6 is a vertical sectional detail on the line 6—6 of Fig. 5, and

Fig. 7 is a bottom view of a dry cell battery and spring holster taken on the line 7—7 of Fig. 4.

The same reference numerals are applied to corresponding parts throughout the views.

Referring first mainly to Figs. 1 and 2, 8 is the sheet metal platform member of inverted cupped form so as to provide depending side walls 9 enclosing a base pan 10 made of sheet metal. 11 is a dial housing of streamline form, as clearly appears in Fig. 1, disposed in the longitudinal median plane of the platform with the pointed tail portion 12 thereof to the rear so as to leave ample foot room on opposite sides thereof. A mat 13 of any suitable wear resisting material, such as linoleum, covers the top of the platform. The usual wishbone levers 14 and 15 are fulcrumed on the platform at 16 and 17, respectively, on legs 18 and 19 projecting downwardly from the platform, as shown. Small sheet metal clips 20, welded or otherwise suitably secured to the legs 18 and 19 and projecting beneath and in spaced relation to the levers 14 and 15 adjacent the fulcrum 16 and 17, serve to retain the levers in assembled relation to the legs 18 and 19 when the platform 8 is inverted preparatory to assembly on the base 10. The levers 14 and 15 are then fulcrumed, as at 21 and 22, respectively, on legs 23 and 24 which project upwardly from the base. A centrally disposed link 14' interconnects the two levers 14 and 15 in the usual way, so as to apply the weight imposed upon the lever 15 at the front end of the platform, as at 17, to the lever 14 along with the weight imposed directly upon the lever 14 at the rear end of the platform, as at 16. The forwardly reaching arm 25 of the lever 14 is connected with the lower end of a coiled spring 26 which resists movement thereof, and the movement of this arm 25 results in the operation of the indicating mechanism, as will soon appear. As the platform 8 is brought down into position over the base 10, three small sheet metal lugs 27 welded or otherwise suitably secured to the inside of the side walls 9 of the platform have the inclined bottom edges 28 thereof arranged to deflect sheet metal tongues 29 that are welded or otherwise suitably secured in the base 10 in register with these lugs 27. The tongues 29 will deflect, as indicated in dotted lines in Fig. 2, a certain distance until lugs 27 come into register with vertical slots provided in the tongues, whereupon there is sufficient spring-back of the tongues to interlock the scale platform and base. Then, if desired, the tongues can be reached through the space between the outside of the base and the lower edge of the platform side walls to forcibly bend these tongues outwardly back to vertical position as they appear in full lines in Fig. 2. One can thereafter lift the scale by means of the platform without danger of the base dropping off.

Referring now to Figs. 2 and 4 to 6, a plate 31 having an upwardly bent circumferential flange 32 telescoping inside the dial housing 11 has a rectangular opening 33 therein and two downwardly bent lugs 34 on opposite sides of said opening. The platform 8 has a registering rectangular opening therein defined by a downwardly bent flange 35 adjacent which the lugs 34 on the plate 31 are disposed when the plate is fastened to the platform by screws 36, clamping the mat 13 therebetween. Bearing brackets 37 which are preferably riveted to the plate 31, as at 38, have the screws 36 entered therethrough, and they provide hangers 39 adjacent the lugs 34, previously mentioned, for bearing support of the dial shaft 40 while the latter is held by engagement with the lugs 34 against endwise movement, or is at least limited in its endwise movement thereby. An elongated pinion 41 on the shaft 40 has meshing engagement at the middle thereof with the rack 42, but has its opposite ends extended through thimbles 43 constituting supporting hubs on a pair of dials 44 and 45. The protruding ends of the shaft 40 at the ends of the pinion 41 extend through center holes in the dials, and in that way the two dials are supported on the shaft and pinion in parallel concentric relation side by side with their annular flanges 46 extending inwardly toward one another but spaced sufficiently to receive the rack 42 and its guide 47 therebetween, as well as the channel-shaped sheet metal extension piece 48 on the arm 25 for operating the rack 42. The extension piece 48 is disposed with the web thereof on the bottom and it carries a cross-pin 49 on the rear end thereof for attachment of the hook of spring 26 thereon, and the arm 25, previously mentioned, fits in the rear end of the piece 48 between the side walls thereof and is arranged to be clamped in place by bending over lugs 50 provided on the upper edge of the side walls of the piece. Since the web of the piece 48 is on the bottom, the lower end of the rack 42 can fit in the channel of the piece 48, as clearly appears in dotted lines at 51 in Fig. 2. A vertical lug 52 bent inwardly from the side wall 9 of the platform 8 at the front end thereof projects into the forked front end 53 of the extension piece 48 to limit the side play of the member in operation and prevent the same from coming in contact with either of the dials 44 and 45. The front end of the extension piece 48 is made forked by simply cutting away the web from between the side walls of the channel, as at 54. A downward extension 11' on the front end of the dial housing 11 covers the opening formed where the lug 52 is bent inwardly, and a screw 11'' serves to fasten the dial housing down, this screw being entered through a hole in the extension 11' and threaded in the wall 9 of the scale platform.

The guide 47 is formed by two pieces of sheet metal 55 of the general form appearing in side view in Fig. 2 and top view in Fig. 5. These pieces are disposed in a vertical plane and riveted or otherwise secured together, as indicated at 56. The guide bracket thus formed is supported at the front end on the plate 31 by slotting the end of the bracket, as at 57, and entering a portion of the plate next to the opening 33 therein. The rear end of the bracket is formed into a fork 58 by bending the pieces 55 apart, as clearly appears in Fig. 5, and this fork rests on top of the plate 31 and is clamped to the plate by a U-shaped sheet metal yoke 59 that fits over the fork 58 and is fastened to the platform 8 along with the plate 31 by means of screws 60. The yoke 59 provides a mounting for the knurled adjusting nut 61 which is threaded on a screw 62 attached to the upper end of the spring 26. The nut 61 projects through a slot 63 in the rear end of the dial housing 11 for manual adjustment. The guide bracket 47 has its pieces 55 bent apart intermediate the ends thereof to form a vertical guide 64 in which the rack 42 operates up and down. Rounded knobs 65 are struck inwardly from the side walls of the guide 64 to lightly engage the opposite sides of the rack 42 so as to hold it in spaced relation to the side walls of the guide to operate as smoothly and as easily as possible. A few cross-pins 66 extend cross-wise through the guide 64 and lightly engage the smooth back of the rack 42 and guide it for straight line vertical motion in proper meshing engagement with the pinion 41 at all times, while still avoiding undue frictional drag upon the movement of the rack. The point contact at 51 between the lower end of the rack and the extension piece 48 on the lever 14 also makes for minimum resistance to movement. It should be apparent, therefore, that the rack 42 is free to gravitate downwardly when the lever 14 is deflected downwardly under the weight of a person standing on the platform 8. The deflection of the spring 26, of course, counterbalances the weight imposed on the platform, and its counter-balancing force is determined by the longitudinal adjustment of the extension piece 48 because that adjustment shifts the pin 49 in a fore and aft direction and accordingly decreases or increases the mechanical advantage of the spring with relation to the lever 14. The lugs 50 are bent into tight engagement with the arm 25 when the proper adjustment has been made. Obviously the dials 44 and 45 turn in a clockwise direction, as viewed in Fig. 2, when the rack 42 gravitates from a position of zero weight indication to some other position when a person stands on the platform. The fact that the dials themselves are accurately positioned in the manner shown in Fig. 4 and the rack 42 is accurately guided, as best appears in Fig. 5, eliminates any danger of the parts rubbing on one another and destroying the accuracy of weighing. The provision of two dials in laterally spaced relation, symmetrically arranged with respect to the rack and pinion, also makes for a well balanced construction, the rack engaging the pinion at the exact middle, half way between the two dials, and the inertia of the dials to either side of this point being the same.

The tops of the dials 44 and 45 are visible through a window 67 in the top of the dial housing 11. A "hair line" 68 extending diametrically of the window transversely with respect to the front end of the scale serves as a pointer or index mark to cooperate with the graduations 69 on the dials 44 and 45. The latter are in broken columns on the two dials, ten pounds being marked off in groups with blank spaces between, and the graduations being in staggered relation on the two dials so that the graduations on one dial occur opposite the blank spaces on the other, as clearly appears in Fig. 5. This feature plus the provision of large easily legible numerals at ten-pound intervals, 0, 10, 20, 30, etc., makes for easy reading by avoiding the blur effect produced where there is a solid column of closely spaced graduations. The graduations themselves are for two pounds and one pound so that when a person stands on the scale platform he has no difficulty in reading his weight to within a pound; he simply notes the large numeral nearest the hair line 68 and to the front of it and then according to the point at which the hair line 68 crosses the graduations behind this large numeral he can quickly tell his weight, it being at once apparent what the weight is in round numbers, and then upon closer inspection, the exact weight within a pound is determined by the hair line. The hair line 68 and the wide band 70 crossing it at right angles are both preferably of vitreous enamel "fired" into the glass on the under side. The band 70 covers up the space between the dials 44 and 45 so that nothing shows but the dial graduations. This band, as will now appear, also acts as a deflector or shield over the electric light bulb 71 to conceal the light bulb from view and at the same time shed the light over the dials and avoid any glare being transmitted through the window 67 when the light is turned on.

The light bulb 71 is mounted in an opening in a piece of insulating material 72 riveted or otherwise secured on an arm 73 carried on one side of the guide bracket 47. The threaded butt 74 of the light bulb makes grounding contact at 75 with the arm 73. A switch terminal 76 makes contact with the other terminal 77 of the bulb and is fastened to the insulation member 72, as indicated at 78. It has an upwardly bent end 79 arranged to make contact with the leaf spring switch blade 80 that is fastened to the insulation member 72 at one end, as at 81, and tends normally to spring downwardly into engagement with the terminal 76 at 79, but is normally prevented from doing so by the rack 42 which engages a button 82 of insulation material carried on the free end of the switch blade 80, holding the blade 80 out of contact with the end 79 of the terminal. It is obvious from this description that if the dry cell battery 83 has its one terminal grounded and its other terminal connected with the blade 80 that the bulb 71 will be lighted when the rack 42 gravitates downwardly in response to movement of the lever 14 under weight imposed on the scale platform, at which time the switch blade 80 contacts the end 79 of the terminal 76. The lighting of the scale is therefore entirely automatic and the light flashes on only so long as someone is standing on the platform; as soon as the weight is removed from the scale platform so that the rack 42 can return to its normal position as shown in Fig. 2, the blade 80 is moved out of contact with the end 79 of the terminal 76, and the light circuit is broken. The spring 80 cannot affect the accuracy of weighing, even though it does exert light pressure on the upper end of the rack 42 when the scale is at rest and there is no weight on the platform, because the rack 42 moves out of engagement with the button 82 on the spring 80 almost the instant weight is applied to the scale platform.

The dry cell battery 83 is mounted in a coiled spring holster 84 which serves not only to support the cell resiliently so that it will not be affected by shock and jar incident to shipment of the scale or rough usage, but it also serves two other important functions, namely, (1) to hold the cell under constant thrust upwardly to insure good contact of its center terminal 85 with the metal cap or closure 86 by which the battery is grounded to the scale platform 8, and (2) to provide a means for automatically expelling the burned out cell when the closure 86 is removed, whereby to permit easily replacing the cell. The upper end of the coiled spring 84 is bent into a large flat coil 87 that is fastened to the scale platform 8 by lugs 88 struck from the sheet metal of the platform. The lower end of the spring 84 is wound spirally in a flat plane, as at 89, to close the bottom of the holster, and a terminal 90 insulated from the spring by a button 91 of insulating material is fastened to the end of the spring at the center of the bottom of the holster. The cell 83 has the usual insulating jacket covering the sides thereof, but the terminal 90 makes contact with the exposed metal bottom of the metal casing forming the other terminal of the cell. The same results are obtained when the cell is inserted upside down, because terminal 85 then touches button 90 and the metal bottom of the cell touches the closure 86. A flexible insulation covered wire 92 connected with the terminal 90 is connected with the switch blade 80 at its remote end, as at 93. The closure 86 fits in an opening 94 provided in the top wall of the scale platform 8. A marginal flange 95 on the closure rests on top of the mat 13 on the platform alongside the opening and there is a lug 96 on one side of the closure arranged to engage under the top wall of the platform at one side of the opening, and a spring latch 97 on the diametrically opposite side of the closure arranged to engage under the top wall of the platform on that side of the opening 94, whereby to retain the closure in place securely but still permit easy removal thereof. A small tab 98 projects above the platform and is integral with the latch 97 and may be engaged by a finger nail or by any instrument entered under it to move the latch 97 out of engagement with the wall of the platform next to the opening 94 so as to permit removal of the closure. As a matter of fact, the closure will spring upwardly like the lid of a "jack in the box" when the latch is released, because the cell 83 under pressure of the spring holster 84 keeps the lid under constant tension toward upward movement. Obviously, when the lid springs up, the cell 83 rises to approximately the dotted line position shown in Fig. 3, and it can therefore be removed readily. With any other arrangement for housing the dry cell battery some other precaution would have to be taken to facilitate withdrawal of the used cell, or else it would be necessary to turn the scale upside down to get the cell out. The spring holster 84 solves the problem in a very convenient manner and in addition affords the other advantages previously mentioned with regard to a resilient shock absorbing mounting and one which insures good electrical contact at the two points 85—86 and 90. Furthermore, the present construction is lighter than others proposed and also reasonably economical and easy to assemble.

It is believed the foregoing description conveys a good understanding of the objects and advantages of my invention. The appended claims have been drawn with a view to covering all legitimate modifications and adaptations.

I claim:

1. In a weighing scale comprising a base and a platform movably supported thereon on spring restrained lever mechanism, a pair of concentric weight indicator dials in parallel, laterally spaced relation, a pinion extending therebetween and connected to turn therewith, a vertical rack meshing with the pinion, a channel member moving with the lever mechanism and reaching between the dials and having the lower end of said rack engaged in the channel thereof, a vertical guide for the free end of said channel member to keep the same in laterally spaced relation to both dials in its up and down movement therebetween, and another vertical guide for said rack to keep it in laterally spaced relation to the dials in its up and down movement therebetween.

2. In a weighing scale comprising a base and a platform movably supported thereon on spring restrained lever mechanism, a weight indicator dial rotatable on a horizontal axis, a pinion for turning the same, a vertical rack meshing with the pinion, an arm movable with the lever mechanism having operative engagement at one point with the lower end of said rack, a coiled tension spring vertically suspended and connected with said arm at another point, a vertical guide for said rack comprising two sheet metal pieces secured together in abutting relation and supported at one end on said platform and bent apart intermediate their ends to provide a guide opening extending vertically receiving said rack for vertical sliding movement, said pieces being further bent apart at the other end to form a fork resting on the platform, a yoke secured to said platform and holding said fork in position, and an adjusting nut and screw for adjusting said spring vertically relative to said platform, one of said nut and screw elements being attached to the upper end of said spring and the other being supported on said yoke.

3. In a weighing scale comprising a base and a platform movably supported thereon on spring restrained lever mechanism, a weight indicator dial rotatable on a horizontal axis, a pinion for turning the same, a vertical rack meshing with the pinion, an arm movable with the lever mechanism having operative engagement at one point with the lower end of said rack, a coiled tension spring vertically suspended and connected with said arm at another point, a vertical guide for said rack comprising two sheet metal pieces secured together in abutting relation and supported at one end on said platform and bent apart intermediate their ends to provide a guide opening extending vertically receiving said rack for vertical sliding movement, said pieces being further bent apart at the other end to form a fork resting on the platform, a yoke secured to said platform and holding said fork in position, a nut swiveled on said yoke and adapted to be manually adjustable, a screw threaded therein and attached to the upper end of said spring to adjust the same vertically relative to the platform, and a dial housing on the platform enclosing said dial and yoke having a slot provided in the wall thereof adjacent the yoke affording access from outside the housing to said nut for adjustment, said housing also having a window provided therein through which said dial is visible.

4. In a weighing scale comprising a base and a platform movably supported thereon on spring restrained lever mechanism, a weight indicator dial rotatable on a horizontal axis, a pinion for turning the same, a vertical rack meshing with the pinion, an arm movable with the lever mechanism having operative engagement with the lower end of said rack, said platform having top and side walls, a guide lug bent from the side wall of said platform in a vertical plane and guiding said arm for vertical movement in spaced relation to said dial, there being an opening formed in said side wall from which the lug is bent, and a dial cover mounted on top of the platform and having an extension reaching downwardly along the outside of said platform and covering the aforesaid opening, said cover having a window provided therein through which said dial is visible.

5. In a weighing scale comprising a base and a platform movably supported thereon on spring restrained lever mechanism, a weight indicator dial rotatable on a horizontal axis, a pinion for turning the same, a vertical rack meshing with the pinion, an arm movable with the lever mechanism having operative engagement at one point with the lower end of said rack, a coiled tension spring vertically suspended and connected with said arm at another point, a vertical guide for said rack comprising two sheet metal pieces secured together in abutting relation and supported at one end on said platform and bent apart intermediate their ends to provide a guide opening extending vertically receiving said rack for vertical sliding movement, said pieces being further bent apart at the other end to form a fork resting on the platform, a yoke secured to said platform and holding said fork in position, said platform having top and side walls, a guide lug bent from the side wall of said platform in a vertical plane and guiding said arm for vertical movement in spaced relation to said dial, there being an opening formed in said side wall from which the lug is bent, a dial cover mounted on top of the platform and having an extension reaching downwardly along the outside of said platform and covering the aforesaid opening, said cover having a window provided therein through which said dial is visible, a nut swivelled on the yoke and accessible from outside said cover through an opening provided therein, and a screw threaded therein and attached to the upper end of said spring to adjust the same vertically relative to the platform.

6. In a weighing scale comprising a base and a platform movably supported thereon on spring restrained lever mechanism, a pair of concentric weight indicator dials in parallel, laterally spaced relation, a pinion extending therebetween and connected to turn therewith, a vertical rack meshing with the pinion, an arm moving with the lever mechanism and extending between the dials and operatively engaging the lower end of said rack at one point, a coiled tension spring vertically suspended and connected with said arm at another point, a vertical guide for said rack disposed between the dials and comprising two sheet metal pieces secured together in abutting relation and supported at one end on said platform and bent apart intermediate their ends to provide a guide opening extending vertically receiving said rack for vertical sliding movement, said pieces being further bent apart at the other end to form a fork resting on the platform, a yoke secured to said platform and holding said fork in position, and an adjusting nut and screw for adjusting said spring vertically relative to said platform, one of said nut and screw elements being attached to the upper end of said spring and the other being supported on said yoke.

7. In a weighing scale comprising a base and a platform movably supported thereon on spring restrained lever mechanism, a pair of concentric weight indicator dials in parallel, laterally spaced relation, a pinion extending therebetween and connected to turn therewith, a vertical rack meshing with the pinion, an arm moving with the lever mechanism and extending between the dials and operatively engaging the lower end of said rack at one point, a coiled tension spring vertically suspended and connected with said arm at another point, a vertical guide for said rack disposed between the dials and comprising two sheet metal pieces secured together in abutting relation and supported at one end on said platform and bent apart intermediate their ends to provide a guide opening extending vertically receiving said rack for vertical sliding movement, said pieces being further bent apart at the other end to form a fork resting on the platform, a yoke secured to said platform and holding said fork in position, a nut swiveled on said yoke and adapted to be manually adjustable, a screw threaded therein and attached to the upper end of said spring to adjust the same vertically relative to the platform, and a dial housing on the platform enclosing said dials and yoke having a slot provided in the wall thereof adjacent the yoke affording access from outside the housing to said nut for adjustment, said housing also having a window provided therein through which said dials are visible.

8. In a weighing scale comprising a base and a platform movably supported thereon on spring restrained lever mechanism, a pair of concentric weight indicator dials in parallel, laterally spaced relation, a pinion extending therebetween and connected to turn therewith, a vertical rack meshing with the pinion, an arm moving with the lever mechanism and extending between the dials and operatively engaging the lower end of said rack, said platform having top and side walls, a guide lug bent from the side wall of said platform in a vertical plane and guiding said arm for vertical movement in spaced relation to said dials, there being an opening formed in said side wall from which the lug is bent, and a dial cover mounted on top of the platform and having an extension reaching downwardly along the outside of said platform and covering the aforesaid opening, said cover having a window provided therein through which said dials are visible.

9. In a weighing scale comprising a base and a platform movably supported thereon on spring restrained lever mechanism, a pair of concentric weight indicator dials in parallel, laterally spaced relation, a pinion extending therebetween and connected to turn therewith, a vertical rack meshing with the pinion, an arm moving with the lever mechanism and extending between the dials and operatively engaging the lower end of said rack at one point, a coiled tension spring vertically suspended and connected with said arm at another point, a vertical guide for said rack disposed between the dials and comprising two sheet metal pieces secured together in abutting relation and supported at one end on said platform and bent apart intermediate their ends to provide a guide opening extending vertically receiving said rack for vertical sliding movement, said pieces being further bent apart at the other end to form a fork resting on the platform, a yoke secured to said platform and holding said fork in position, said platform having top and side walls, a guide lug bent from the side wall of said platform in a vertical plane and guiding said arm for vertical movement in spaced relation to said dials, there being an opening formed in said side wall from which the lug is bent, a dial cover mounted on top of the platform and having an extension reaching downwardly along the outside of said platform and covering the aforesaid opening, said cover having a window provided therein through which said dials are visible, a nut swivelled on the yoke and accessible from outside said cover through an opening provided therein, and a screw threaded therein and attached to the upper end of said spring to adjust the same vertically relative to the platform.

10. In a weighing scale, the combination of a base, lever supporting fulcrums thereon, a platform, other lever fulcrums thereon, a pair of platform supporting levers constructed to operatively engage the base and platform fulcrums, the same being interconnected and being operatively connected with counterbalancing spring means and weight indicating means on the platform, and means for supporting the levers loosely in at least approximate operative relation to the fulcrums on the platform, whereby the platform constitutes a unitary assembly with the supporting levers and counterbalancing spring means and weight indicating means, which assembly is adapted to be placed on the base so that the levers operatively engage the supporting fulcrums thereon.

11. In a weighing scale, the combination of a base, lever supporting fulcrums thereon, a platform, other lever fulcrums thereon, a pair of platform supporting levers constructed to operatively engage the base and platform fulcrums, the same being interconnected and being operatively connected with counterbalancing spring means and weight indicating means on the platform, means for supporting the levers loosely in at least approximate operative relation to the fulcrums on the platform, whereby the platform constitutes a unitary assembly with the supporting levers and counterbalancing spring means and weight indicating means, which assembly is adapted to be placed on the base so that the levers operatively engage the supporting fulcrums thereon, and means providing a detachable lost-motion connection between the base and platform permitting downward movement of the platform relative to the base under weight imposed on the platform but preventing upward movement thereof.

12. In a weighing scale comprising a base and a platform movably supported thereon on spring restrained lever mechanism, a weight indicator dial adapted to be rotatably mounted on the platform to turn on a horizontal axis, a horizontal shaft for supporting said dial and a pinion for turning the same, a rack meshing with the pinion and operable by the spring restrained lever mechanism and means on the platform for supporting and enclosing said dial comprising a top plate resting on the platform having an opening provided therein to receive the dial registering with an opening provided in the platform, said plate having downwardly bent lugs on opposite sides of the opening for abutment with the ends of the dial shaft, two angle members superimposed on the top plate at opposite sides of the opening providing downwardly projecting lugs in spaced parallel relation to the aforesaid lugs and perforated to receive the ends of the dial shaft for rotary support thereof, means for securing the angle members and top plate to the platform, and a dial housing enclosing the dial and positioned by engagement with said plate.

13. In a weighing scale comprising a base and a platform movably supported thereon on spring restrained lever mechanism, a weight indicator dial adapted to be rotatably supported on the platform to turn on a horizontal axis, the dial having a horizontal shaft and a pinion for turning the same meshing with a rack movable with the lever mechanism, and means for supporting and enclosing said dial on the platform, comprising a separate top plate having an opening provided therein to receive the dial registering with an opening provided in the platform, bearings on said plate for the dial shaft, a dial housing enclosing the dial and positioned by engagement with the top plate, and means for detachably securing the dial housing and top plate to the platform.

14. In a weighing scale, comprising a base and a platform movably supported thereon on spring restrained lever mechanism, a pair of concentric weight indicator dials in parallel laterally spaced relation adapted to be rotatably mounted on the platform to turn on a horizontal axis, the dials having a common shaft and a pinion for turning the same disposed between the dials, a rack meshing with the pinion and movable between the dials in the movement of the lever mechanism, guide means for the rack extending between the dials in spaced relation thereto, a top plate having an opening provided therein to receive the dials registering with an opening provided in the platform, means for supporting the aforesaid rack guide means on said plate in said opening, bearings on the top plate for the dial shaft, a dial housing enclosing said dials and positioned by engagement with the top plate, and means removably securing said dial housing and top plate to the platform.

15. In a weighing scale comprising a base and a platform movably supported thereon on spring restrained lever mechanism, a weight indicator dial adapted to be rotatably supported on the platform to turn on a horizontal axis, the dial having a horizontal shaft and a pinion for turning the same meshing with a rock movable with the lever mechanism, a top plate for supporting the dial having an opening provided therein to receive the dial registering with an opening provided in the platform, bearings on said plate for the dial shaft, a screw and nut adjusting means mounted on said plate and adapted to be operatively connected with the spring means of the spring restrained lever mechanism, a dial housing enclosing the dial and positioned by engagement with said top plate, said housing partially enclosing the screw and nut spring adjusting means, and means for removably securing the top plate and housing to the platform.

16. In a weighing scale comprising a base and a platform movably supported thereon on spring restrained lever mechanism, a pair of concentric weight indicator dials in parallel laterally spaced relation adapted to be rotatably mounted on the platform to turn on a horizontal axis, the dials having a common shaft and a pinion for turning the same disposed between the dials, a rack meshing with the pinion and movable between the dials in the movement of the lever mechanism, guide means for the rack extending between the dials in spaced relation thereto, a top plate having an opening provided therein to receive the dials registering with an opening provided in the dials registering with an opening provided in the platform, means for supporting the aforesaid rack guide means on said plate in said opening, bearings on the top plate for the dial shaft, screw and nut adjusting means carried on a support on the top plate and adapted to be operatively connected with the spring means of the spring restrained lever mechanism, said support having engagement with the means for supporting the rack guide means whereby to hold the rack guide means in spaced relation to the dials, a dial housing enclosing the dials and positioned by engagement with said top plate, said housing partially enclosing the screw and nut spring adjusting means, and means for removably securing the top plate and housing to the platform.

17. In a weighing scale comprising a base and a sheet metal platform movably supported thereon on spring restrained lever mechanism, said platform having an illuminated opening provided in one end thereof extending longitudinally with respect to the platform and defined by downwardly projecting marginal reenforcing flanges, a dial adapted to be rotatably mounted in said opening to turn on a horizontal axis, a shaft for turning the dial carrying a pinion, a rack meshing with the pinion and movable with the lever mechanism, a top plate having an opening provided therein to receive the dial registering with the opening in the platform, bearing means on said plate at opposite sides of the opening receiving the opposite ends of the dial shaft, said plate having an upwardly projecting marginal reenforcing flange, a dial housing enclosing the dial and positioned by engagement with the marginal flange, and means for removably securing the top plate and dial housing to the platform.

18. In a weighing scale comprising a base and a platform movably supported thereon on spring restrained lever mechanism, a pair of concentric weight indicator dials in parallel laterally spaced relation, a pinion extended therebetween and connected to turn therewith, a vertical rack meshing with the pinion, said lever mechanism having an extension reaching between the dials for operating said rack from the lower end thereof, a vertical guide for said extension to maintain the same in laterally spaced relation to both dials in the up and down movement of said rack, and another vertical guide for said rack to maintain the same in laterally spaced relation to said dials in the up and down movement of the rack.

19. In a weighing scale comprising a base and a platform movably supported thereon on spring restrained lever mechanism, a pair of concentric weight indicator dials in parallel laterally spaced relation, a pinion extended therebetween and connected to turn therewith, a vertical rack meshing with the pinion, said lever mechanism having an extension reaching between the dials for operating said rack from the lower end thereof, and vertical guide means for said extension and rack to keep the same in laterally spaced relation to the dials in the up and down movement thereof relative to the dials.

JOHN C. SUTTON.